United States Patent
Zhang

(10) Patent No.: US 9,692,775 B2
(45) Date of Patent: Jun. 27, 2017

(54) METHOD AND SYSTEM TO DYNAMICALLY DETECT TRAFFIC ANOMALIES IN A NETWORK

(71) Applicant: Telefonaktiebolaget L M Ericsson (publ), Stockholm (SE)

(72) Inventor: Ying Zhang, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 377 days.

(21) Appl. No.: 13/872,855

(22) Filed: Apr. 29, 2013

(65) Prior Publication Data
US 2014/0325649 A1    Oct. 30, 2014

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| H04L 12/26 | (2006.01) |

(52) U.S. Cl.
CPC ........ *H04L 63/1425* (2013.01); *H04L 43/024* (2013.01); *H04L 43/026* (2013.01); *H04L 43/12* (2013.01); *Y02B 60/33* (2013.01)

(58) Field of Classification Search
USPC ........................................................ 726/23
See application file for complete search history.

(56) References Cited

U.S. PATENT DOCUMENTS

| | | | |
|---|---|---|---|
| 8,767,754 B1* | 7/2014 | Muthuswamy et al. | 370/401 |
| 2007/0153689 A1* | 7/2007 | Strub et al. | 370/230 |
| 2009/0303879 A1* | 12/2009 | Duffield et al. | 370/235 |
| 2011/0273988 A1* | 11/2011 | Tourrilhes | H04L 41/0816 370/237 |
| 2013/0064079 A1 | 3/2013 | Zhang | |
| 2013/0173784 A1* | 7/2013 | Wang et al. | 709/224 |
| 2014/0010235 A1* | 1/2014 | Ueno | H04L 45/745 370/392 |

(Continued)

OTHER PUBLICATIONS

C.-W. Chang, G. Huang, B. Lin, and C.-N. Chuah, "Leisure: A framework for load-balanced network-wide traffic measurement," in ANCS, 2011.*

(Continued)

*Primary Examiner* — Christopher Revak
*Assistant Examiner* — Vadim Savenkov
(74) *Attorney, Agent, or Firm* — Nicholson De Vos Webster & Elliott LLP

(57) ABSTRACT

Methods implemented in a network are disclosed for dynamically distributing tasks of traffic anomaly monitoring and detecting traffic anomalies. The method starts collecting traffic statistics of large blocks of traffic flows as traffic aggregates. Based on the traffic statistics of traffic aggregates, a traffic anomaly is detected. Then for a traffic aggregate with a traffic anomaly, increased traffic sampling rate is applied to a smaller set of traffic flows within the traffic aggregate. If the smaller set of traffic flows does not contain a percentage of the traffic within the traffic aggregate, the sampling rate is further increase to an even smaller set of traffic flows until a small set of traffic flows are identified as the ones cause the traffic anomaly.

21 Claims, 9 Drawing Sheets

(56) References Cited

U.S. PATENT DOCUMENTS

2014/0280338 A1* 9/2014 Metz .................. H04L 41/0853
707/774

OTHER PUBLICATIONS

V. Sekar, M. K. Reiter, W. Willinger, H. Zhang, R. R. Kompella, and D. G. Andersen, "Csamp: a system fornetwork-wide flow monitoring," in Proceedings of the 5th USENIX Symposium on Networked Systems Design and Implementation, NSDI'08, 2008.*
F. Khan, N. Hosein, C.-N. Chuah, and S. Ghiasi, "Streaming solutions for fine-grained network traffic measurements and analysis," inANCS, 2011.*
L. Jose, M. Yu, and J. Rexford, "Online measurement of large traffic aggregates on commodity switches," in USENIX Hot-ICE, 2011.*
L. Huang, et al., "Communication-Efficient Tracking of Distributed Cumulative Triggers", IEEE, 2007, 10 pages.
"OpenFlow Switch Specification" Version 1.1.0 Implemented ( Wire Protocol 0x02 ), Feb. 28, 2011, 56 pages.
N. McKeown, et al., "OpenFlow: Enabling Innovation in Campus Networks", Mach 14, 2008, 6 pages.
Mai, Jianning et al., "Is Sampled Data Sufficient for Anomaly Detection?", Proceedings of the 6th ACM SIGCOMM Conference on Internet Measurement, 2006, pp. 165-176.
Yuan, L. et al., "ProgME: Towards Programmable Network MEasurement", ACM SIGCOMM, 2007 pp. 97-108.
Zhang, Ying, "An Adaptive Flow Counting Method for Anomaly Detection in SDN", ACM, 2013, 6 pages.

* cited by examiner

Divide Traffic Flow to Aggregates 352

Aggregate A: 301 – 302 – 303 – 304

Aggregate B: 301 – 303 – 305

Aggregate C: 301 – 305 – 304

FIG. 3A

Compute Monitor Counts Of Network Devices 354

Sort Network Devices According To Monitor Counts 356

Distribute Aggregate Monitoring To Network Devices 358

302: Aggregate A
303: Aggregate B
304: Aggregate C
301: Available
305: Available

FIG. 3D

METHOD AND SYSTEM TO DYNAMICALLY DETECT TRAFFIC ANOMALIES IN A NETWORK

FIELD OF INVENTION

The embodiments of the invention are related to the field of networking. More specifically, the embodiments of the invention relate to a method and system to dynamically detect traffic anomalies in a network.

BACKGROUND

In a data or computing network, traffic anomaly detection is a major concern. Traffic anomalies include unusual and significant changes in a network's traffic levels, which can often span multiple links and nodes. Diagnosing traffic anomalies is critical for both network operators and end users. It is a difficult problem because one must extract and interpret anomalous patterns from large amounts of high-dimensional, noisy data, as traffic variation is large by nature.

Understanding the nature of traffic anomalies in a network is important for at least two reasons, regardless of whether a traffic anomaly is malicious or unintentional:

(a). Traffic anomalies can create congestion in a network and stress resource utilization of network devices (e.g., routers or switches), thus it is critical to detect traffic anomalies from an operational standpoint;

(b). Traffic anomalies can have a drastic impact on a customer or an end user even (e.g., service down due to misconfiguration of network devices) even if it does not necessary impact the network.

A significant problem in diagnosing traffic anomalies is that its formation and cause can vary considerably: from Denial of Service (DoS) attack, to router misconfiguration, to the results of network device policy modification (e.g., border gateway protocol (BGP) policy changes), and etc. For example, DoS attack occurs when a large amount of traffic sent from one or more hosts consumes a large amount of resources in the network such as a link or a web server. This artificially increased high load denies (prevents) services to legitimate users of that resource. Despite many academic proposals in this area, today's Internet still has few protection mechanisms to prevent such attacks. Moreover, distributed DoS attack (DDoS) is even more dangerous. DDoS attack can also target at the network infrastructure beyond the individual web servers.

In order to identify traffic anomalies, network and system administrators have begun to deploy automated response systems to look for anomalous behaviors that might be an attack. However, these automated response systems can be difficult to deploy, partially because the lack of support from the commercial router/switch vendors. Also they often are heavy weighted, meaning that they require capturing a large amount of traffic in the network and thus introduce a large overhead to both the network management system and the network itself. A better way to detect traffic anomalies is needed.

SUMMARY

A method implemented in a network for dynamically distributing task of traffic anomaly monitoring is disclosed. The method starts with dividing traffic flows of the network into a plurality of traffic aggregates, wherein each traffic aggregate contains one or more traffic flows, and wherein each traffic aggregate is an entry of a first set for monitoring. For each entry of the first set for monitoring, the method collects a second set of one or more network devices from the network devices of the network to monitor the entry, wherein the second set of one or more network devices processes traffic flows contained within the entry. It selects one network device from the second set of one or more network devices to monitor the entry for a traffic anomaly, wherein the selecting one network device from the second set of one or more network devices is at least partially based on a monitor count of the network device, wherein the monitor count of the network device is a count of a number of entries of the first set for monitoring that the network device is assigned to monitor.

A method implemented in a network for dynamically detecting traffic anomalies is disclosed. The method starts with a selected network device sampling traffic flows within an entry of a first set for monitoring at a first sampling rate. It determines if a traffic anomaly exists. In response to the determination that a traffic anomaly may exist with high probability, the method increases the first sampling rate to a second sampling rate, divides the entry of the first set for monitoring into a first number of smaller groups, and selects a first subset of the first number of smaller groups for monitoring. Then the method continues to sample the first subset of the first number of smaller group at the second sampling rate, determines that a percentage of traffic within the first subset of the first number of smaller groups is not over a traffic percentage threshold computed from the traffic distribution. In response to the determination that the percentage of traffic within the first subset of the first number of smaller group is not over the traffic percentage threshold, the method increases the second sampling rate to a third sampling rate, divides the first subset of the first number of smaller group into a second number of smaller groups, and selects a second subset of the second number of smaller groups for monitoring. Then it samples the second subset of the second number of smaller group at the third sampling rate, determines that a percentage of traffic within the second subset of the second number of smaller groups is over the traffic percentage threshold. In response to the determination that the percentage of traffic within the second subset of the second number of smaller groups is over the traffic percentage threshold, it reports that the second subset of the second number of smaller groups for monitoring being the abnormal traffic flows.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 3A-D illustrates a method of sharing the loads for anomaly detection among network devices according to one embodiment of the invention.

DETAILED DESCRIPTION

Figure 1:
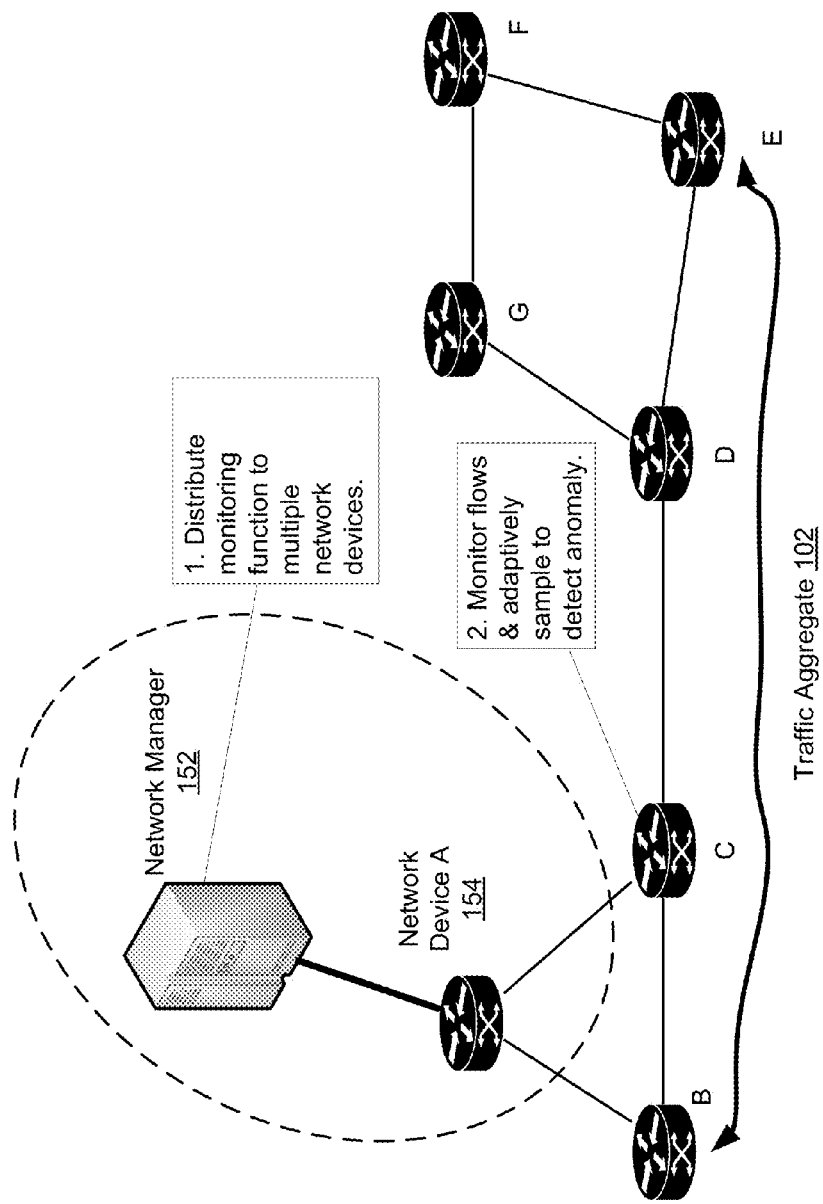
FIG. 1 is a block diagram illustrating a network utilizing dynamic anomaly detection according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

DoS Prevention and Anomaly Detection

A less auspicious aspect of the Internet model is that receivers of a network connecting to the Internet may have no control over the resources consumed on their behalf: a host can receive a repetitive stream of packets regardless of whether the stream of packets is desired. One approach to address the vulnerability is for the network to limit communication to previously established patterns, e.g., by giving legitimate hosts an authenticator off-line that permits them to communicate with specific destinations. This approach does not protect public servers that are in general unable to arrange an offline authenticator for legitimate senders prior to communication.

Another approach is to limit host communication patterns to client-server only by separating client and server address spaces. The proposed "Off by Default" method is similar to the approach in spirit. The network does not permit any two hosts to communicate by default, unless a destination explicitly requests to receive from a sender. Both solutions limit DoS attacks to private end hosts, but require additional mechanisms to protect open public servers.

Outside of identifying and preventing DoS, general traffic anomaly detection is important for network management. In prior art, rule-based or statistical techniques are used to classify traffic patterns as friendly or malicious. Existing anomaly detection schemes operate on single time series of traffic, measured for example from a network link, and independent of traffic on other links in a network. Thus, these techniques exploit temporal patterns within a single traffic time series to expose anomalies.

These prior anomaly detection approaches have at least several drawbacks:

(a). The existing anomaly detection mechanisms are generally implemented in a commercial anomaly detection box, which integrates many complex functionalities. Thus the cost of procuring the commercial anomaly detection box and operating it is usually high.

(b). Since the commercial anomaly detection box is usually a black box to the network operator, it lacks programmability. The commercial anomaly detection box is often developed by third party commercial companies. It is separated from other network devices, and it is typically close-sourced, difficult to program and configure. In most anomaly detection algorithms, certain thresholds are used to differentiate an attack traffic pattern from normal traffic. These thresholds usually are derived from the network traffic distribution, which should be tuned under different network environments. With a black box, it's hard to dynamically adjust thresholds. Also, new variations of anomalies and malicious DoS attacks are generated frequently, and the black box may not be able to be updated in time to detect newer variations of anomalies and attacks.

(c). The commercial anomaly detection box usually sits in one location of the network, collecting huge amount of traffic statistics. The separate box typically uses traffic tapping based approach to gather network states and traffic statistics. It generates additional overhead to the network.

(d). The existing anomaly detection mechanisms are difficult to integrate anomaly detection and mitigation. In existing approaches, once an alarm is raised by an anomaly detection engine, a network operator needs to react by manually configuring the network such as rerouting, ingress filtering, or traffic shaping. The manual intervention is inflexible, slow and expensive.

Network Configurations and Operations

Embodiments of this invention disclose light-weight methods to detect traffic anomalies by only using the commodity network devices. The methods are scalable and can be utilized in a large network. The methods are also generic and can be applied to any networks with a centralized anomaly detection manager. In one embodiment, the method collects coarse grained traffic statistics first. Then, based on the coarse-grained information, it adaptively narrows down to a subset of traffic flows and closely monitors for possible attacks. Since embodiments of this invention detect traffic anomalies dynamically based on ongoing traffic characteristics, they are referred to as methods of "dynamic anomaly detection," or "dynamically detecting traffic anomalies" herein.

FIG. 1 is a block diagram illustrating a network utilizing dynamic anomaly detection according to one embodiment of the invention. Network 100 contains network manager 152. Network manager 152 can be a network management system (NMS), an element management system (EMS), or other centralized network manager of network 100. Network 100 also contains network devices A-G for network traffic forwarding/processing. Network devices A-G can be a router, a switch, or other networking equipment as described herein above. In one embodiment, network manager 152 is integrated with one network device, such as network device A at reference 154. In other words, network manager 152 may not be a standalone entity in network 100, and some network device may perform functionalities of network manager 152.

Task boxes 1 to 2 illustrate the order in which operations are performed according to one embodiment of the invention. At task box 1, network manager 152 distributes traffic flow monitoring function to multiple network devices. Network manager 152 is aware of traffic flows within network 100, and it knows routes of particular traffic flows. For a traffic carrying network, traffic flows are numerous, and monitoring/detecting anomaly is very computing intensive. Thus, network manager 152 monitors traffic flows by traffic aggregates. A traffic aggregate is a set of traffic flows sharing some common characteristics, for example, same source address or destination address blocks, port number blocks, traffic type (e.g., same quality of service (QoS) requirements), or other traffic characteristics.

In this example, traffic aggregate 102 are a number of traffic flows sharing the same route goes through network devices B-C-D-E. The bidirectional traffic aggregate arrives and leaves network 100 at network devices B and E, thus network devices B and E may be referred to as "ingress" network devices. In one embodiment, network manager 152 identifies the ingress network devices B and E only and distributes monitoring functions to ingress network devices B and E. In an alternate embodiment, network manager 152 further distributes monitoring functions to other network devices along the path of traffic aggregate 102. With network manager distributing the monitoring functions among multiple network devices, the workload caused by monitoring functions is reduced on a given network device.

At task box 2, a selected network device (network device C in the example) for monitoring the particular traffic aggregate then monitors the traffic aggregate (traffic aggregate 102) and adaptively samples traffic flows within the traffic aggregate to detect anomaly. The selected network device may detect a traffic anomaly by identifying a deviation from a normal traffic distribution of traffic aggregate 102. Once a traffic anomaly is detected, network device C then further samples traffic aggregate 102 more closely by increasing sampling rate and/or focusing on particular subset of traffic flows within the abnormal traffic aggregate until network device C identifies one or more traffic flows that contain anomaly. In other words, the detection of anomaly is an adaptive process, starting from a coarse-grained traffic statistics of traffic aggregate 102, and adaptively narrowing down to a subset of traffic flows within the abnormal traffic aggregate until a small set of abnormal traffic flows with the abnormal traffic aggregate is identified.

The distributing-and-filtering method aims at dynamically detecting traffic anomalies efficiently while without introducing too much work load on the network and individual network devices. The distribution at network manager 152 is based on that network manager 152 is aware of traffic flows within network 100, thus it can distribute traffic monitoring functionalities to various network devices efficiently without overburdening a few network devices within network 100.

A network device starts with monitoring only assigned traffic aggregates (thus filtering out other traffic aggregates). It then searches for and detects a deviation from the normal pattern of the assigned traffic aggregates. Once a deviation is detected, the network device narrows down filtering and picks only a subset of the assigned traffic aggregate for anomaly detection. The process continues until the network device finds a set of one or more traffic flows within the traffic aggregate so that the set of one or more traffic flows contains a percentage of traffic within the traffic aggregate over a threshold. In one embodiment, the network device notifies network manager 152 to reallocate the not-selected traffic flows within the traffic aggregate for anomaly detection. Network manager 152 then redistributes the not-selected traffic flows to another network device for monitoring, by considering the monitoring capability left on each network device. With dynamic distribution of the traffic aggregate among a number of network devices, each network device is not overburdened with anomaly detection tasks, and the method can be scaled to be implemented in a large network with hundreds, thousands, or more network devices.

Some current interfaces may be utilized for implementing the dynamic anomaly detection methods in existing networks. For example, The IETF (Internet Engineering Task Force) IPFIX (IP Flow Information Export) Working Group has defined a set of interfaces to export IP flow information from routers, switches to network management systems for performance monitoring and accounting/billing purposes. It specifies IP flow information being formatted and transformed from an exporter to a collector.

The IETF IPFIX Work Group defines the information model and the IPFIX protocol. More specifically, in a network, a metering process collects data packets at an observation point. The metering process can perform simple filtering and aggregation tasks, in order to reduce the amount of data transferred. Using the IPFIX protocol, an exporter sends the information to a collector. There can be many exporters and many collectors in the network. Each exporter can communicate with many collectors and vice versa.

The dynamic anomaly detection methods may utilize the IPFIX protocol to collect IP flow information, filter and aggregate IP flows for anomaly detection. When utilizing the IPFIX protocol, network manager and network devices can be collectors and exporters, depending on implementation. For example, a network manager can be a collector collecting IP flow information, which is exported by network devices. Network devices can implement observation points utilizing a metering process collects data packets and filtering out them to detect anomalies.

The dynamic anomaly detection methods may also be implemented in a newer networking architecture, the Software Defined Networking (SDN). SDN is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

Figure 2:
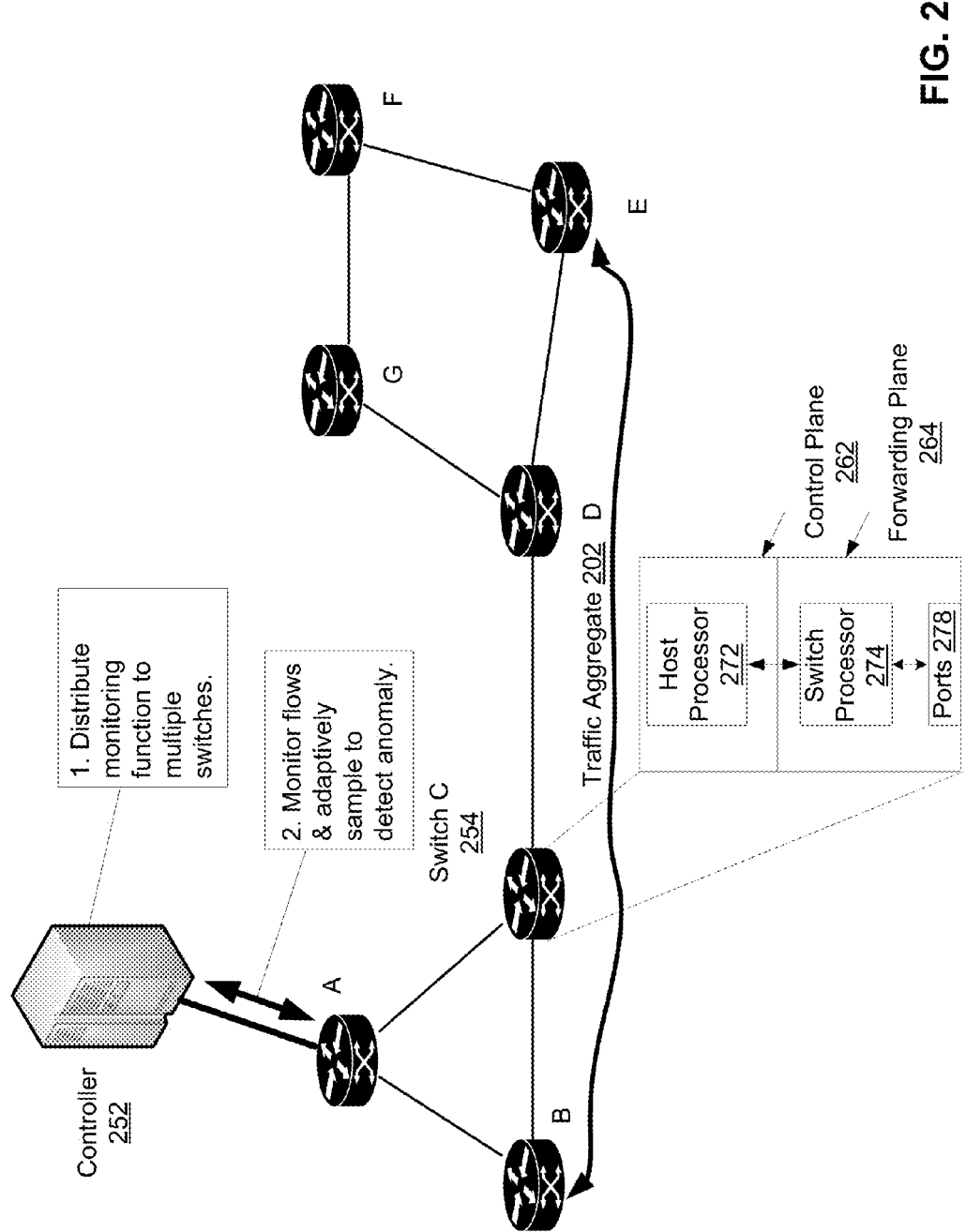
FIG. 2 is a block diagram illustrating a SDN network utilizing dynamic anomaly detection according to one embodiment of the invention.

FIG. 2 is a block diagram illustrating a SDN network utilizing dynamic anomaly detection according to one embodiment of the invention. SDN network 200 comprises a number of forwarding elements and a number of controllers that instruct the forwarding elements' forwarding behavior. Note a SDN network may contain a much larger number of network devices and existing network devices may be implemented with SDN compatible protocols thus become a part of a SDN network (e.g., an existing IP router may support OpenFlow protocol and thus become a SDN forwarding element or a SDN controller). Thus SDN network 200 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network devices. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 2, SDN network 200 contains SDN controller 252 and a set of forwarding elements (or SDN switches, the terms "forwarding element" and "SDN switch" are used interchangeably herein below) A-G. Controller 252 (the terms "controller" and "SDN controller" are used interchangeably herein below) manages SDN switches A-G, and an SDN switch connects to its managing controller through a communication channel and the SDN switch not necessarily has a direct connectivity to a controller (thus the term "remote" controller).

An SDN switch can be viewed logically as containing two main components. One is a control plane and the other is a forwarding plane. A zoom-in view of SDN switch C at reference 254 illustrates the two planes. SDN switch C contains control plane 262 and forwarding plane 264. Control plane 262 coordinates management and configuration of SDN switch C. Configuration of forwarding plane 264 is achieved by running applications on host processor 272. Host processor 272 usually runs an operating system in order to provide a well-known development environment. Commands from host processor 272 are sent to the switch processor 274 using an interconnect (e.g., a peripheral component interconnect (PCI) bus). Exception packets (e.g., packet for routing and management) are often processed on host processor 272. Switch processor 274 interacts with various forwarding ports 278 of SDN switch C to forward and otherwise process incoming and outgoing packets.

Forwarding plane 264 is responsible for forwarding traffic (forwarding operations includes switching, routing, learning, etc.). It contains switch processor 274 that is designed to provide high throughput at the detriment of a more complex and flexible development environment. Different types high performance memory and hardware accelerator are often found on board of switch processor 274 for achieving the high throughput. In contrast, host processor 272 can be more complex and flexible at the detriment of providing high throughput as it processes more control packets (often referred to as slow path packets) than data packet thus throughput is less mission critical. When a SDN switch (e.g., SDN switch C) receives a packet associated with a new flow, it does not know where to forward the packet. Thus it sends the packet to its managing SDN controller, controller 252 in this example. Controller 252 receives the packet, and it programs a new flow entry and sends to SDN switch C. SDN switch C then forwards the packet according to the new flow entry.

An SDN network provides an opportunity to design dynamic anomaly detection methods in a network that makes use of the centralized control plan and the network-wide knowledge. More specifically, dynamic anomaly detection methods can be implemented as an application running on the SDN controller. The application can interact with the routing application in the same controller to perform mitigation actions after a traffic anomaly is detected. Thus, the traffic anomaly and migration can be integrated without manual intervention. The SDN controller already has commands to collect flow statistics from the SDN switches, and dynamic anomaly detection methods can utilize these existing interfaces.

On the other hand, the decoupling of control/forwarding plane in an SDN network presents a challenge in achieving efficiency and scalability with dynamic anomaly detection methods. The following discussion explores deploying dynamic anomaly detection methods in an SDN network in more details.

Task boxes 1 to 2 illustrate the order in which operations are performed according to one embodiment of the invention. At task box 1, controller 252 distributes traffic flow monitoring function to multiple network devices. As discussed herein above, controller 252 is a centralized controller, and it manages all the SDN switches to perform various operations, including which path to route traffic, what priority each traffic flow has, what traffic statistics to collect, etc. Such architecture provides an opportunity where any centralized logical decisions can be imposed and carried out easily. In the context of detection, the controller can have a complete network-wide view for detection. For a traffic carrying network, traffic flows are numerous, and monitoring/detecting anomaly is very computing intensive. Thus, controller 252 may monitor traffic flows by traffic aggregates. A traffic aggregate is a set of traffic flows sharing some common characteristics, for example, same source address or destination address blocks, port number blocks, traffic type (e.g., same quality of service (QoS) requirements), or other traffic characteristics.

In this example, traffic aggregate 202 are traffic flows sharing the same route goes through SDN switches B-C-D-E. The bidirectional traffic aggregate arrives and leaves network 200 at network SDN switches B and E, thus SDN switches B and E may be referred to as "ingress" SDN switches. In one embodiment, controller 252 identifies the ingress SDN switches B and E only and distributes monitoring functions to ingress SDN switches B and E. In an alternate embodiment, controller 252 further distributes monitoring functions to other SDN switches along the path of traffic aggregate 202. With controller distributing the monitoring functions among multiple SDN switches, the workload caused by monitoring functions is reduced on a given SDN switch.

At task box 2, controller 252 polls traffic statistics of a particular traffic aggregate from a selected SDN switch (SDN switch C) and adaptively samples traffic flows within the traffic aggregate to detect anomaly. Controller 252 may detect a traffic anomaly by identifying a deviation from the normal traffic distribution of the traffic aggregate. Once a traffic anomaly is detected, controller 252 then further samples traffic aggregate 202 more closely by increasing sampling rate and/or focusing on particular traffic flows within the abnormal traffic aggregate until controller 252 identifies one or more traffic flows that contain anomaly. In other words, the detection of anomaly is an adaptive process, starting from a coarse-grained traffic statistics of traffic aggregates, and adaptively narrowing down to a subset of traffic flows within the abnormal traffic aggregate until a small set of abnormal traffic flows with the abnormal traffic aggregate is identified.

A controller starts with sampling traffic at a SDN switch for assigned traffic aggregates (thus filtering out other traffic aggregates). It then detects a deviation from normal pattern of the assigned traffic aggregates. Once a deviation is detected, the SDN controller narrows down filtering and picks only a subset of the assigned traffic aggregate for anomaly detection. The process continues until the controller finds a set of one or more traffic flows within the traffic aggregate so that the set of one or more traffic flows contains a percentage of traffic within the traffic aggregate over a threshold. In one embodiment, controller 252 to reallocate the not-selected traffic flows within the traffic aggregate to other SDN switches to detect anomaly. With dynamic distribution of traffic aggregate among a number of SDN switches, each SDN switch is not overburdened with anomaly detection tasks, and the method can be scaled to be implemented in a large network with hundreds, thousands, or more SDN switches.

In a traditional architecture where control plane and traffic forwarding plane are integrated, the traffic forwarding elements usually are coupled with a smart control plane in the same physical box. Therefore, some complex computations can be carried out locally within the box. In a SDN network, however, SDN switch is supposed to perform only the basic forwarding functions, meaning that all intelligent logic needs to be implemented in a separated controller such as controller 252. The SDN switches can send traffic counters to controller 252 periodically. However, the granularity choices at both the temporal and spatial domain are critical. If the statistics are collected in a large period, e.g. half an hour, then the anomaly detection algorithms may not be able to pick out the short-lived anomalies. On the other hand, if the collection is done every few seconds, it can generate a lot of traffic to the network, and a large amount of load to the controller. Therefore, the embodiments of the invention aim at striking a balance to provide accurate detection without imposing too much load to the network.

Distributing Traffic Flows for Anomaly Monitoring

For anomaly monitoring in a network, prior art has disclosed approaches that relies on custom streaming algorithms that modify complex data structures on demand. For example, a paper entitled "Communication-Efficient Tracking of Distributed Cumulative Triggers," by Ling Huang, et al, discloses such an approach. The embodiments of the invention take a different approach, where the distributing traffic flow for anomaly monitoring use simple match-and-count rules where the network manager or controller only adjust the rules periodically.

The principle within the embodiments of the invention is to detect large traffic aggregates by adaptively adjusting the wildcard rules and producing intermediate useful results at a somewhat coarser level of aggregation. This approach may lead to a short delay in detecting the traffic anomalies. But on the other hand, this trade-offs can be configurable and tunable, depending on the operators' needs.

In a SDN network, for each incoming packet, an SDN switch compares the packet header simultaneously against a collection of monitoring rules, picks the matching rule with the highest priority, and increments its associated counter. Since TCAMs (Ternary Content Addressable Memories) used in SDN switches are expensive and power hungry, an SDN switch has a limit N on the number of rules that can be used for traffic monitoring. An SDN controller can run directly on the SDN switch or on a separate machine managing the entire network. The SDN controller reads the counters from the TCAM rules at a fixed measurement interval M, analyzes the counters, and generates statistics to report to the network operators. The SDN controller also dynamically adapts the rules based on the counter values from previous measurement intervals.

In both traditional and SDN networks, anomaly detection needs to identify significant traffic changes. Without losing generality, the term "network devices" covers both traffic forwarding elements within a traditional network and a SDN switch. The term "network manager" covers both an element to control and manage network devices in a traditional network and a SDN controller in a SDN network. In order to reduce the work load on both network devices and network managers, embodiments of the inventions may: (a) share the load of the ingress network devices by performing monitoring on multiple network devices along the path of traffic, and/or (b) monitor large traffic aggregates and sample small traffic aggregates.

FIGS. 3A-D illustrates a method of sharing the loads for anomaly detection among network devices according to one embodiment of the invention. The method can be implemented in both traditional network and a SDN network. In a SDN network, it will be implemented in a SDN controller.

In FIG. 3A, traffic flows are grouped into various traffic aggregates. Each traffic aggregate contains a number of traffic flows that share some common characteristics. In this example, all traffic flows within an aggregate share a common route within the network. Thus each traffic aggregate is associated with a set of network devices that traffic flows within.

In FIG. 3B, each network device is given a monitor count based on how many traffic aggregates the network device forwards through. The monitor count is used to denote the most traffic aggregate a network device covers as a network device can only cover a traffic aggregate that is forwarded through the network device. In this example, network device 301 has the highest count at 3 as all three aggregates being forwarded through it (thus network device 301 is an ingress) while network device 302 has the lowest count at 1 as only aggregate A being forwarded through it.

In FIG. 3C, the network devices are sorted based on monitor counts in an ascending order, where the network device with the lowest monitor count is listed first and the network device with the highest monitor count being listed last. Thus network device 302 is the first in the sorted list and network device 303 is the last.

Then in FIG. 3D, the method assigns the network device with the lowest monitor count to one of the traffic aggregate it covers. The traffic aggregate associated with the assigned network device is then removed from the aggregate set. Assuming each network device can only monitor one traffic aggregate, the network device is removed from a candidate network device set too. The next traffic aggregate with equal or higher monitor count is assigned to the next network device covering the traffic aggregate. The process continues until all traffic aggregates are assigned to network devices. In this example, aggregates A-C are assigned to network devices 302, 303, and 304 respectively, and network devices 301 and 305 do not monitor for traffic anomalies.

Figure 4:
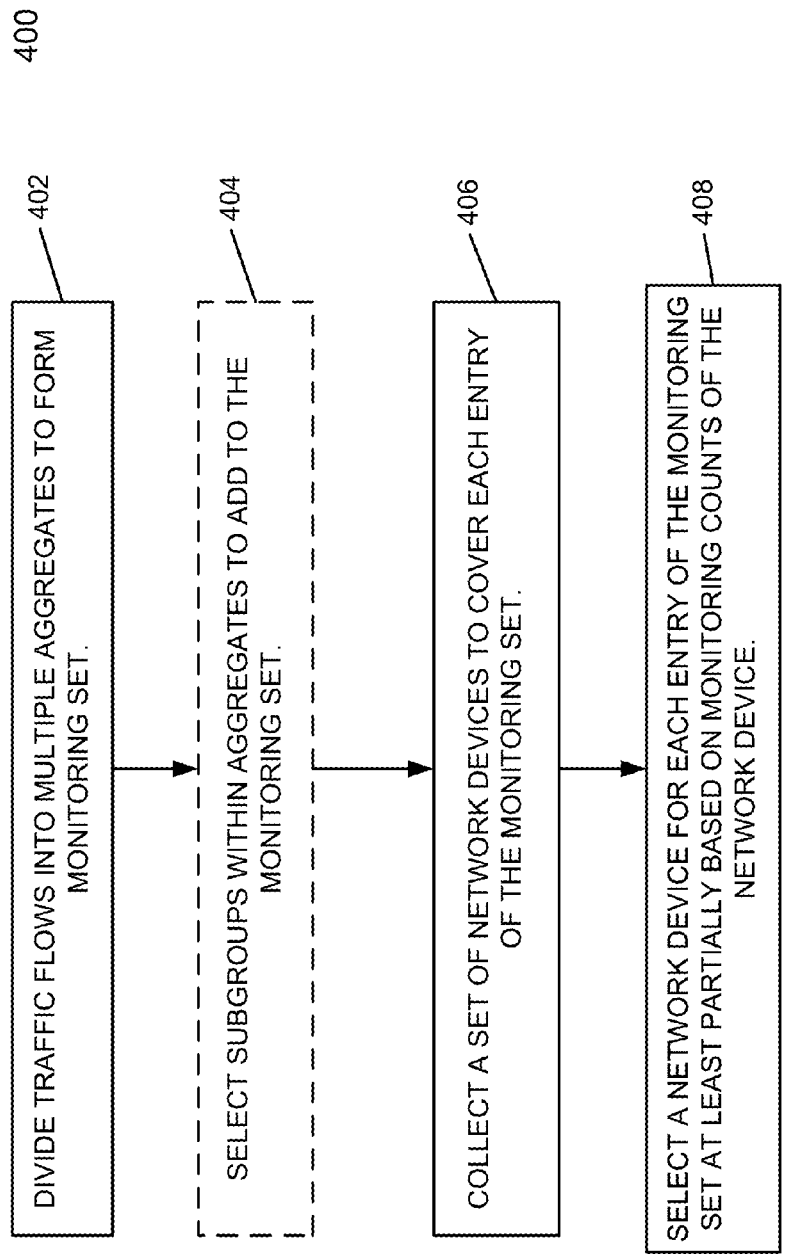
FIG. 4 is a flow diagram illustrating a method of sharing the loads for anomaly detection among network devices according to one embodiment of the invention.

In an operating network, generally there are a lot more traffic aggregates, and a network device often needs to monitor multiple traffic aggregates. A network device has a capacity limit as of how many traffic aggregate it can monitor. In one embodiment, a network device is not removed from the candidate network device set until the network device has been assigned to a number of traffic aggregates, where the number reaches its capacity limit FIG. 4 is a flow diagram illustrating a method of sharing the loads for anomaly detection among network devices according to one embodiment of the invention. Method 400 can be implemented in both traditional and SDN networks. In a traditional network, it can be implemented in a network manager or a network device. In a SDN network, it will be implemented in a SDN controller. For simplicity of discussion, a SDN controller is used as an example, even though the method is viable in a traditional network, on a network manager or a network device.

Method 400 starts with dividing traffic flows of a network into multiple aggregates to form a monitor set by a SDN controller at operation 402. Each aggregate contains one or more traffic flows, and each aggregate is to be monitored separately for traffic anomalies. Traffic flows can be divided based on a variety of criteria. For example, the division can be based on source or destination address blocks of traffic flows, port numbers reflecting different applications, or other traffic characteristics. An operator of a network may change the traffic division based on network condition and the network of anomaly detection.

Note method 400 may be triggered by a traffic flow update within the network. For example, when a traffic flow is created or removed from the network. It may also triggered by a request by a network manager, where the network manager indicates a list of traffic flows to be divided and optionally how the list of traffic flows to be divided (e.g., what traffic characteristics to be utilized in making the division).

Optionally the flow moves to operation 404, where a number of subgroups of traffic flows within a traffic aggregate is added to the monitor set. The operational operation is use to uncover traffic anomalies in smaller groups masked by a larger aggregate. The subgroup of traffic flows within the traffic aggregate is selected by randomly sampling the aggregate with a sampling interval in one embodiment. The smaller the sampling interval, the more subgroups are added to the monitor set. Thus, with the operation 404, the monitor set includes both a set of traffic aggregates and a set of subgroups of traffic flows within the set of traffic aggregates.

The flow moves to operation 406, where the SDN controller collects a set of network devices to cover each entry of the monitor set. An entry of the monitor set can be a traffic aggregate or a subgroup of traffic flows within the traffic aggregate. For each entry of the monitor set, the SDN controller only collects and includes network devices that traffic flows within the entry of the monitor set pass through.

Then the flow moves to operation 408, where the SDN controller selects a network device for each entry of the monitor set, and the selection is at least partially based on a monitoring count of the network device. The monitoring count of the network device is a count of a number of entries of the monitor set that the network device is assigned to monitor. The embodiments of the invention aims at distributing the responsibility of monitoring traffic anomalies to multiple network devices, and the distribution preferably considers how many entries of the monitor set that the network device has already signed up to monitor. In some embodiment, the distribution may also consider the monitoring capacity limitation of the network device, which may be different for different network devices.

One embodiment of method 400 is illustrated in FIGS. 3A-D, but other embodiments with different means to sort traffic aggregates and select network devices can be implemented following the principle disclosed.

Figure 5:
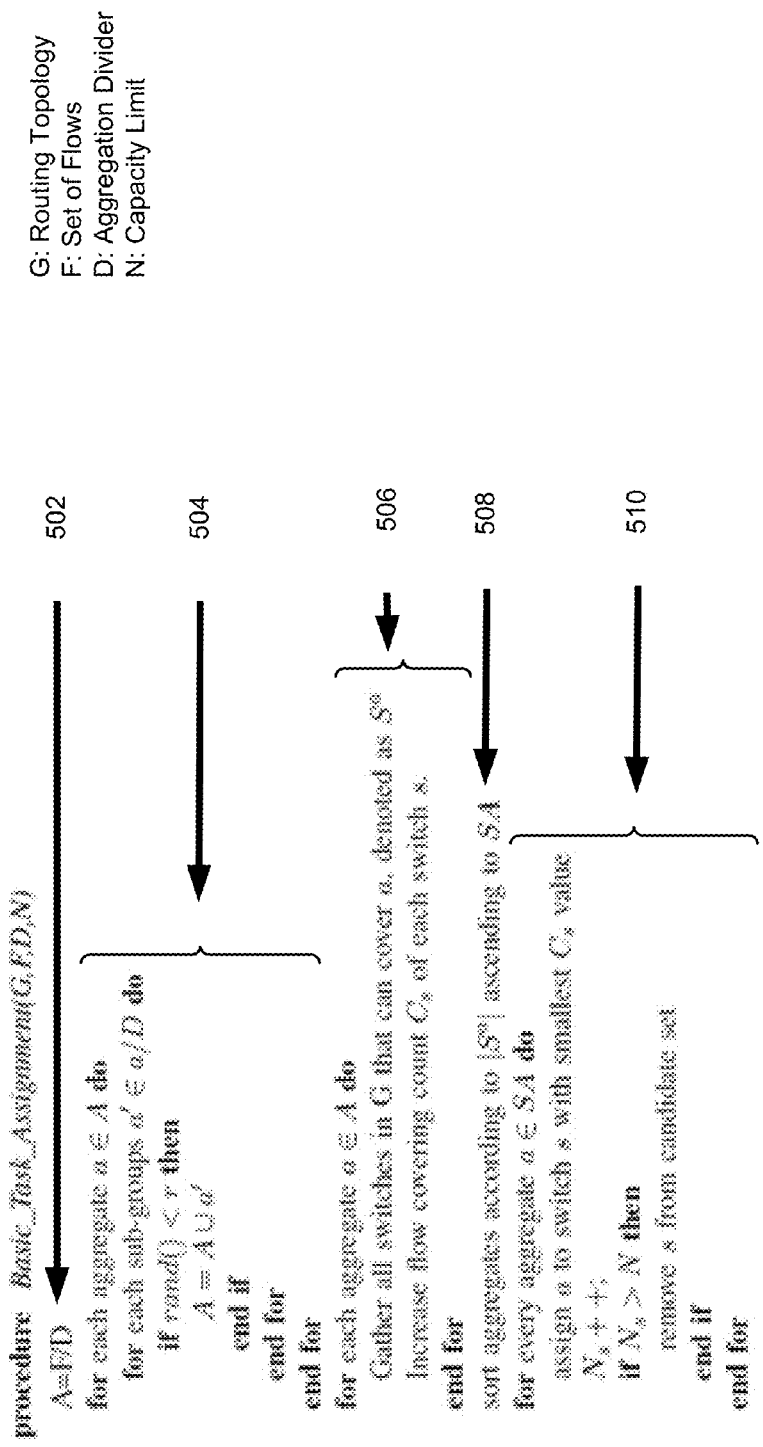
FIG. 5 is a pseudo code program illustrating a method of sharing the loads for anomaly detection among SDN switches of a SDN network according to one embodiment of the invention.

FIG. 5 is a pseudo code program illustrating a method of sharing the loads for anomaly detection among SDN switches of a SDN network according to one embodiment of the invention. The pseudo code program takes input of routing topology G, the set of flows F, the aggregate divider D, and the capacity limits on each switch N.

At reference 502, aggregate sets is set to be A (the monitor set), which is generated by applying D on F. Then at reference 504, for each aggregate a within aggregate set A, a subgroup of traffic flow within aggregate a, denoted as a', is selected, through a random sampling rand( ) at a sampling rate r. At reference 506, using topology G, for each element in the monitor set A, a set of switches are marked in set $S^a$ as the set that may be able to monitor the element.

Then the aggregates are sorted according to the SDN switch counts at reference 508, where each SDN switch counted is one that the aggregate passes through. At reference 510, for each aggregate, a switch is assigned, starting with the switch with lowest monitoring count $C_s$. Once the switch is assigned, a monitor assignment count, $N_s$ is increased by one, and the switch is removed from the assignment list, once Ns reaches the monitoring count limitation, N. The process completes once all aggregates within A are assigned.

Dynamic Zoom-In and Expand for Anomaly Monitoring

Once the monitoring function is distributed among multiple network devices, the assigned network devices will then monitor for traffic anomalies. As discussed herein above, the monitor set may include both aggregates and subgroups within the aggregates. Thus, a network device, in a traditional or SDN network, monitors each entry within an assigned monitor set to detect traffic anomalies. Embodiments of the invention deploy dynamically zooming in an entry within the assigned monitor set and expanding the monitoring to spot anomalies.

Figure 6:
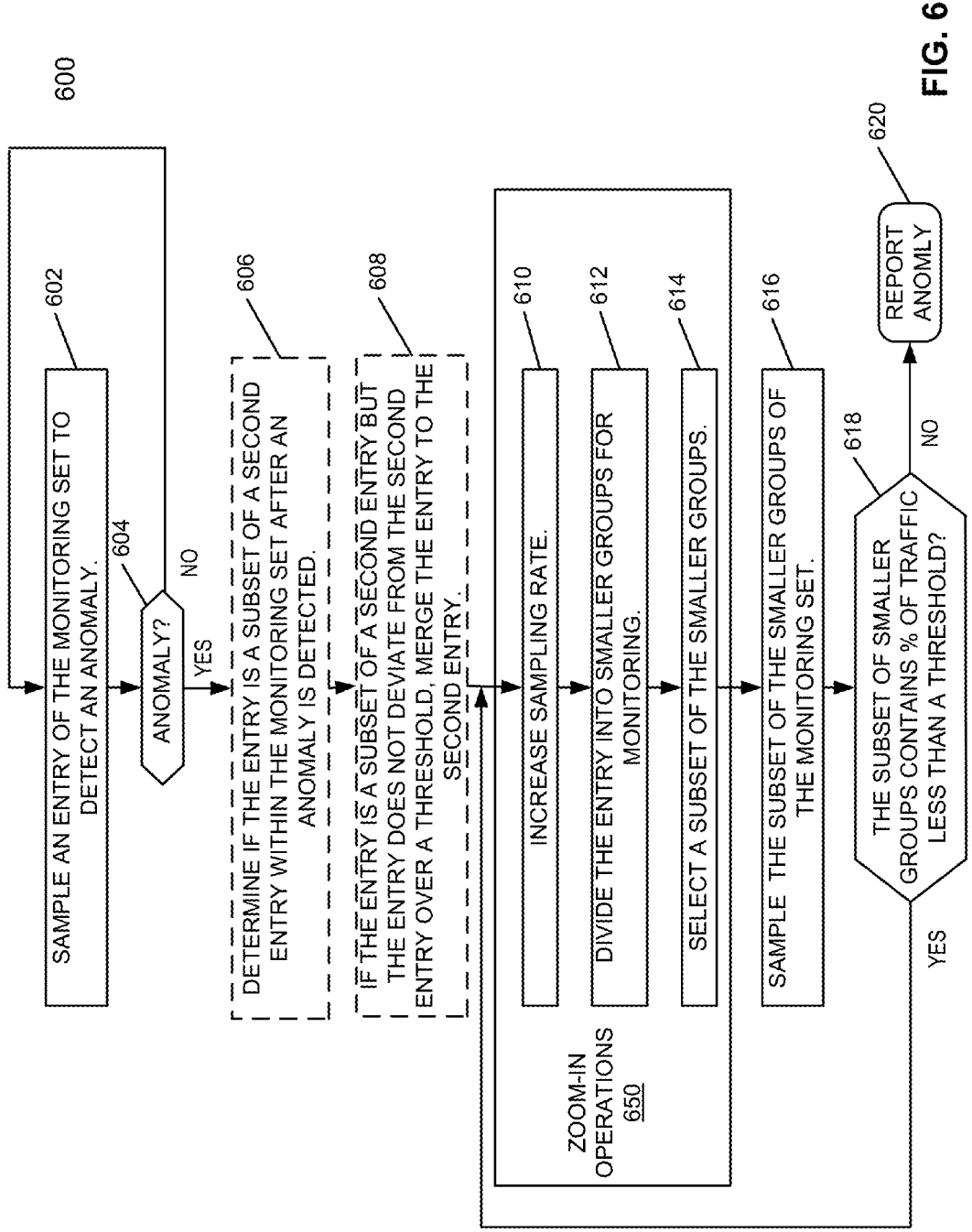
FIG. 6 is a flow diagram illustrating dynamic zoom-in of anomaly monitoring according to one embodiment of the invention.

FIG. 6 is a flow diagram illustrating dynamic zoom-in of anomaly monitoring according to one embodiment of the invention. Method 600 can be implemented in a SDN controller in a SDN network or integrated within traffic monitoring function of a network manager within a traditional network. For simplicity of discussion, a SDN controller is used as an example, even though the method is viable on a network manager such as EMS/NMS in a traditional network.

Method 600 starts with operation 602, where a SDN controller samples an entry of an assigned monitor set of an SDN switch at a sampling rate. The SDN controller samples a traffic aggregate or subgroup of a traffic aggregate and collect traffic characteristics such as packet or byte counts during a sampling period. The SDN switch provides requested traffic characteristics to the SDN controller. At operation 604, the SDN controller determines whether or not there is a traffic anomaly within the entry. In one embodiment, the determination is based on a deviation of traffic characteristics from a historical pattern. For example, a Bayesian transform can be used to detect sudden jumps in a time series of data. For another example, a standard deviation of packet/byte counts from a moving average of the packet/byte counts over a threshold is an indication that there is a traffic anomaly. When no traffic anomaly is detected, the process returns to operation 602 and the SDN controller continues sampling the same entry at the SDN switch with the same sampling rate.

The method optionally flows to operation 606 when a traffic anomaly is detected at the entry of the assigned monitor set. The SDN controller determines if the entry is a subset of another entry within the monitor set. If the entry is a subset of another entry, and the traffic anomaly deviation is not over a deviation threshold, the entry is merged into the larger entry at operation 608. In other words, the SDN controller determines that the entry is not separately monitoring-worthy as it is not different enough from the larger entry. The merging operations 606-608 are the opposite of zooming-in and expanding, but they filter out necessary sampling and reduce the number of entries to be monitored thus generally increase efficiency of the method.

Then the flow goes to operation block 650, which is referred to as zoom-in operations. Zoom-in operations aim at providing fine-grained examination of traffic flows within the entries of monitor set, once coarse-grained examination (e.g., operations 602-604) detects anomaly. At operation 610, the SDN controller increases the sampling rate of the entry. The increased sampling rate (accompanied by reduced the sampling interval) provides a temporal zoom-in of traffic flows. In one embodiment, the sampling rate is doubled.

Also within zoom-in operation 650, the SDN controller divides the entry of the monitor set into smaller groups at operation 612. The division provides a spatial zoom-in of traffic flows. In one embodiment, the SDN controller assigns a subset of the smaller groups to the SDN switch at operation 614, and assigns other smaller groups within the entry to other SDN switches. The reassignment of the other smaller groups may be performed through distributing traffic flow method disclosed in discussion associated with FIGS. 4-5. With the reassignment, the list of smaller groups and optionally how the list of traffic flows to be divided (e.g., what traffic characteristics to be utilized in making the division) are provided for the SDN controller to allocate the list of smaller groups to other SDN switches for monitoring.

Note operation 610 and operations 612-614 may not be performed in the order, and in some embodiment, division and selection of operations 612-614 may be performed prior to increasing the sampling rate.

The flow then goes to operation 616, wherein the SDN controller samples the subset of the smaller groups that assigned to the SDN switch. Note the sampling rate is the new rate specified in operation 610. Then the SDN controller determines if the subset of smaller groups contains a percentage of traffic of the assigned subset over a threshold at operation 618. Conceptually, when the smaller group contain a high percentage of traffic of the entry, it is likely the traffic flows are the ones with a traffic anomaly—a spike of traffic consuming large amount of network resources. The SDN controller predetermines a threshold to determine that the sampled traffic flows are small enough to identify the source of the traffic anomaly in one embodiment. In another embodiment, the threshold is a configurable parameter, and network operators or end user may adjust the threshold based on network condition and the granularity need of anomaly detection.

If the subset of smaller groups contains a percentage of traffic higher than the threshold, at operation 620, the anomaly is reported with the traffic flows within the subset of smaller group listed. Then the SDN controller may perform remedial operations such as removing abnormal traffic flows or troubleshooting the root cause of the traffic anomaly.

With method 600, a SDN controller (or a network manager of a traditional network) detects traffic anomalies without taking significant processing/bandwidth resources. It may collect coarse-grained traffic statistics on a large address block initially through sampling traffic aggregates.

The collected coarse-grained traffic statistics are then compared with historical data to determine if there is a suspicious deviation. If a suspicious deviation is identified, the SDN controller (or a network manager of a traditional network) programs a set of SDN switches (or other network devices of a traditional network) to collect more information—the SDN switch currently assigned to monitor the large address block continues monitor a subset of the large address block, but other SDN switch will share the load and take on other subset of the large address block for monitoring anomaly. With the fine-gained information on more specific address ranges are collected through zoom-in temporally (by increasing sampling rate) and spatially (by focusing on smaller address ranges), the SDN controller is able to narrow down whether a true anomaly occurs.

For a SDN network, the method can be implemented easier as SDN controller can maintain the network state and dynamically adapt the routes according to the network and server states. For a traditional network, the method can be implemented using existing interfaces like ones defined by IPFIX protocols.

Figure 7:
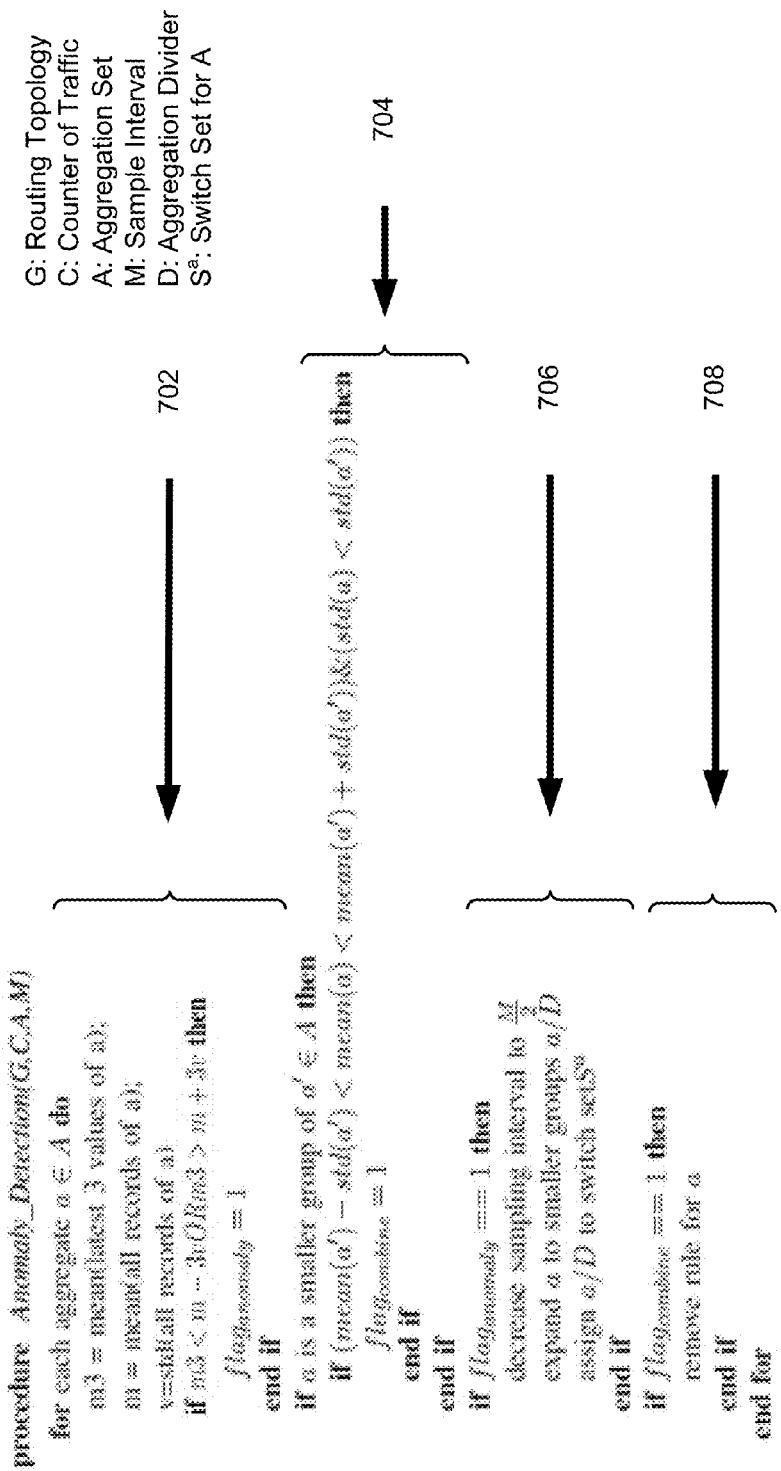
FIG. 7 is a pseudo code program illustrating a method of zooming-in for anomaly detection of a SDN network according to one embodiment of the invention.

FIG. 7 is a pseudo code program illustrating a method of zooming-in for anomaly detection of a SDN network according to one embodiment of the invention. The pseudo code program may be executed on an application of a SDN controller and it takes input of routing topology G, counter of traffic C, aggregate set A, and sampling interval M.

At reference 702, the SDN controller detects traffic anomalies at each aggregate. The SDN controller determines that a traffic anomaly exists at a traffic aggregate by measuring the latest traffic (represented by means of latest three values) against the mean of the all records of the aggregate, and a standard deviation of all records of the aggregate. If a traffic anomaly is detected, a flag is set indicating the traffic anomaly.

At reference 704, the SDN controller determines that if a is a smaller group of another traffic aggregate, denoted as a', whether or not the smaller group deviates from the larger a' enough, if it is not, the "combine" flag is set. Later at reference 708, the smaller group a is merged after the merger flag is set. At reference 706, for traffic aggregate that are abnormal, the sampling interval is cut in half to M/2, and the aggregate is reduced to a/D and the a/D is assigned to $S^a$ to be distributed to other switches. The application will run through all traffic aggregate and each anomaly detected at coarse-grain through operations within reference 702 then goes through operations within references 704-708 to zoom-in and identify the offending small number of traffic flows within the traffic aggregate.

Network Devices Implementing Dynamic Traffic Anomaly Detection

Figure 8:
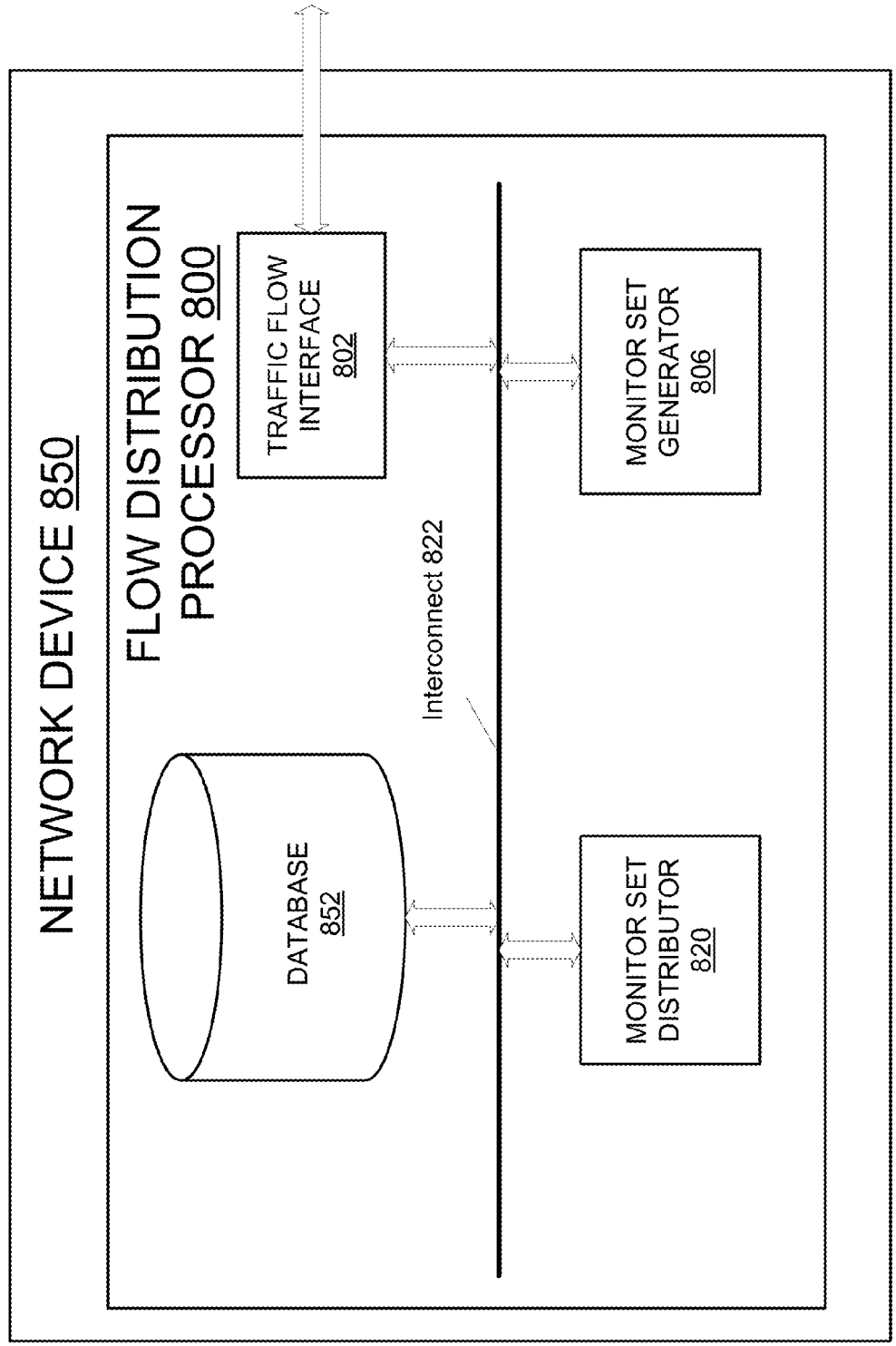
FIG. 8 is a block diagram illustrating a network device containing a processor implementing a method of distributing traffic flows according to one embodiment of the invention.

FIG. 8 is a block diagram illustrating a network device containing a processor implementing a method of distributing traffic flows according to one embodiment of the invention. Flow distribution processor 800 may be a standalone processor or a part of a processor within a SDN controller of a SDN network or a network device of a traditional network. That is, network device 850 may be a SDN controller or a network device. When flow distribution processor 800 is a part of a larger processor, it may have dedicated NPU or share processing unit with other application.

Flow distribution processor 800 may contain traffic flow interface 802, monitor set generator 806, monitor set distributor 820, and database 852. These various modules are interconnected through interconnect 822. Note that various modules can be implemented as a single unit or multiple units, the unit or units integrate various modules and perform similar function as the modules of flow distribution processor 800, and these modules can be implemented in software, hardware or a combination thereof. In addition, some modules illustrated in FIG. 8 may be implemented outside of flow distribution processor 800 but communicatively coupled with flow distribution processor 800.

Traffic flow interface 802 is configured to receive traffic flows of the network that network device 850 is in. The received traffic flows are processed at monitor set generator 806, which is configured to divide the received traffic flows of the network into a number of traffic aggregates. Each traffic aggregate contains one or more traffic flows, and each traffic aggregate is an entry of a monitor set. Monitor set distributor 820 is configured to distribute entries within the monitor set to various network devices such as SDN switches in a SDN network. The distribution is at least partially based a number of traffic aggregate that a network device is assigned to monitor. A network device generally contains a monitoring limit and the limit is stored in database 852.

In one embodiment, flow distribution processor 800 receives a list of traffic flow at traffic flow interface 802. The arrival of the list of traffic flows may be triggered by a change of traffic flow of the network, or a request due to zoom-in operations of an existing anomaly detection process. The list of traffic flows are then included to a monitor set of the monitor set generator 806. Monitor set generator 806 generates entries for monitoring, including traffic aggregates and subset of traffic aggregates. The generated entries are then distributed by monitor set distributor 820. Distributor 820 distributes entries within the monitor set by various methods, such as illustrated in FIGS. 3 and 4. Through flow distribution processor 800, traffic flows are distributed to various network devices within the network for anomaly detection.

Figure 9:
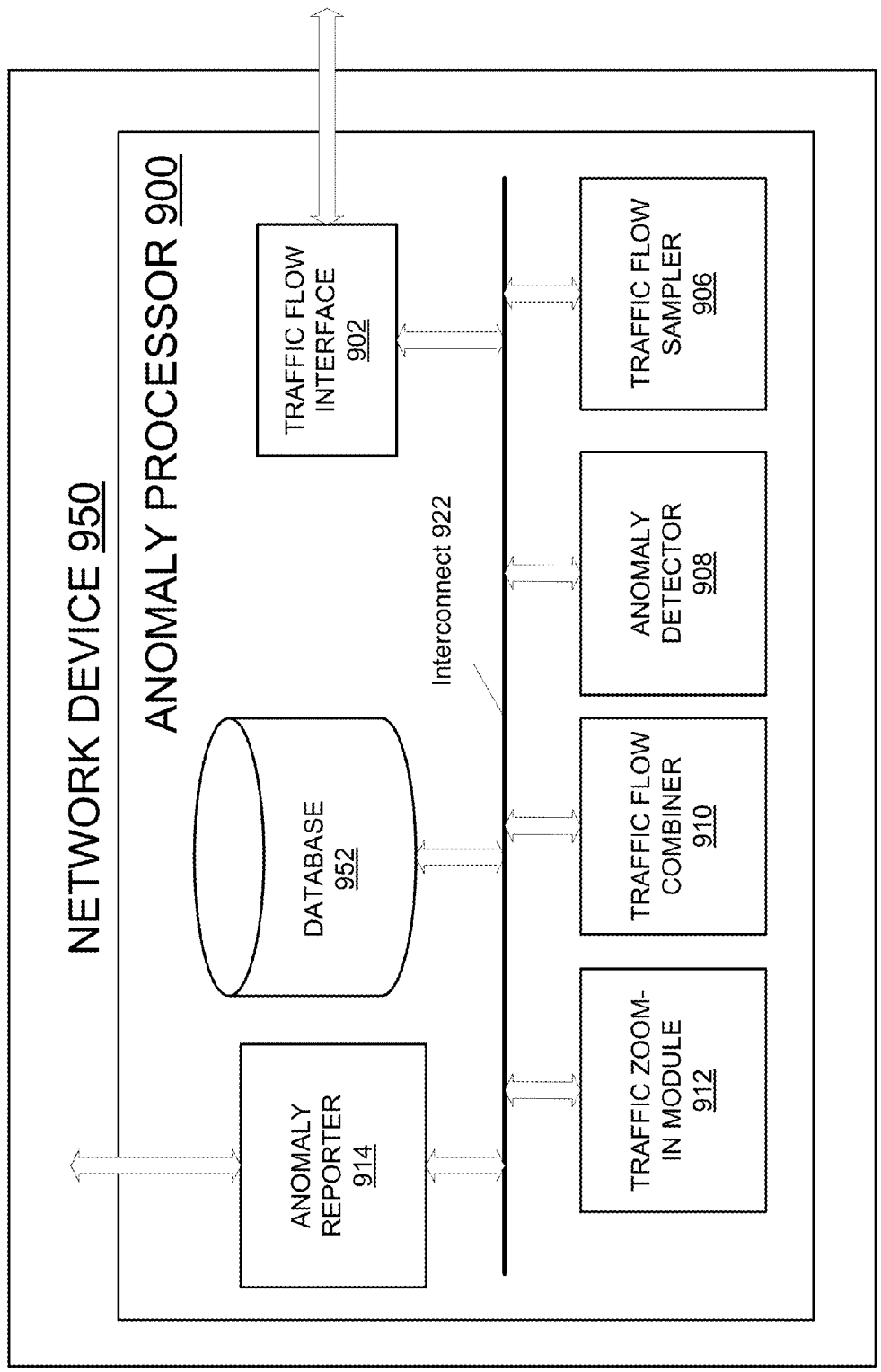
FIG. 9 is a block diagram illustrating a network device containing a processor implementing a method of zooming-in for anomaly detection according to one embodiment of the invention.

FIG. 9 is a block diagram illustrating a network device containing a processor implementing a method of zooming-in for anomaly detection according to one embodiment of the invention. Anomaly processor 900 may be a standalone processor or a part of a processor within a SDN controller of a SDN network or a network device of a traditional network. That is, network device 950 may be a SDN controller or a network device. When anomaly processor 900 is a part of a larger processor, it may have dedicated NPU or share processing unit with other application. Also note that anomaly processor 900 and flow distribution processor 800 may be implemented in a single network device, and they may be even integrated into one single processor. That is, a single processor may perform the functions of flow distribution processor 800 and anomaly processor 900.

Anomaly processor 900 may contain traffic flow interface 902, traffic flow sampler 906, anomaly detector 908, traffic flow combiner 910, traffic zoom-in module 912, anomaly reporter 914, and database 952. These various modules are interconnected through interconnect 822. Note that various modules can be implemented as a single unit or multiple units, the unit or units integrate various modules and perform similar function as the modules of anomaly processor 900, and these modules can be implemented in software, hardware or a combination thereof. In addition, some modules illustrated in FIG. 9 may be implemented outside of flow distribution processor 900 but communicatively coupled with flow distribution processor 900.

Traffic flow interface 902 is configured to receive traffic flows of the network that network device 950 is in. Note traffic flows are generally received as entries for monitoring such as traffic aggregates or smaller group of the traffic aggregates. The entries for monitoring are sampled by traffic flow sampler 906. Traffic flow sampler 906 may sample the entries for monitoring at a sampling rate. Based on the sampling, anomaly detector 908 is configured to detect traffic anomalies in the entries. After anomaly is detected, traffic zoom-in module 912 starts an adaptive process of increasing sampling rate and reduce the size of entries with traffic anomalies. The adaptive process completes once a subset of an abnormal entry contains a percentage of traffic of the entry over a certain percentage threshold. Once the adaptive process completes, anomaly reporter 914 reports that a traffic anomaly has been detected with the subset of traffic flows are identified. Database 952 contains the percentage threshold for the adaptive process to complete, and the percentage threshold may be configurable. Note traffic zoom-in module 920 can be implemented in a variety of ways, and they may perform operations such as zoom-in operation box 650 illustrated in FIG. 6 and operations in reference 706 illustrated in FIG. 7.

In some embodiments, traffic flow combiner 910 combines an entry to a superset included the entry if the entry does not contain a traffic anomaly distinctly different from the superset.

The operations of the flow diagram are described with reference to the exemplary embodiment of FIGS. 8 and 9. However, it should be understood that the operations of flow diagrams can be performed by embodiments of the invention other than those discussed with reference to FIGS. 4 and 6, and the embodiments discussed with reference to FIGS. 8 and 9 can perform operations different than those discussed with reference to the flow diagrams of FIGS. 4 and 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network, wherein the network contains network devices, wherein traffic flows transmit through a number of network devices of the network, the method comprising:
  dividing traffic flows of the network into a plurality of traffic aggregates, wherein each traffic aggregate contains one or more traffic flows, and wherein each traffic aggregate is an entry of a first set for monitoring;
  selecting one or more traffic flows within a traffic aggregate to be one entry of the first set for monitoring, wherein the one or more traffic flows are randomly selected from the traffic aggregate; and
  for each entry of the first set for monitoring,
    collecting a second set of one or more network devices from the network devices of the network to monitor the entry, wherein the network devices of the network serve as software-defined networking (SDN) switches, wherein the second set of one or more network devices processes traffic flows contained within the entry, and wherein the processing includes forwarding packets in the traffic flows according to rules in flow tables programmed by a SDN controller of the network; and
    selecting one network device from the second set of one or more network devices to monitor the entry for a traffic anomaly, wherein the selecting one network device from the second set of one or more network devices is at least partially based on a monitor count of the network device, and wherein the monitor count of the network device is a count of a number of entries of the first set for monitoring that the network device is assigned to monitor.

2. The method of claim 1, wherein the selecting one network device from the second set of one or more network devices is further based on a monitor limitation of the network device.

3. The method of claim 1, wherein the operations within are performed when there is an update of traffic flows within the network.

4. The method of claim 1, wherein the operations within are performed upon a request, wherein the request includes at least one of:
  a granularity parameter for the dividing the traffic flows; and
  a selected traffic flows to be divided.

5. The method of claim 1, wherein the selected network device to monitor an entry of the first set for monitoring performs anomaly detection, and wherein a traffic anomaly is detected by:
  sampling traffic flows within the entry of the first set for monitoring at a first sampling rate;
  determining that a traffic anomaly exists in the selected network device;
  in response to the determination that a traffic anomaly exists,
    increasing the first sampling rate to a second sampling rate;
    dividing the entry of the first set for monitoring into a first number of smaller groups;
    selecting a first subset of the first number of smaller groups for monitoring while assigning one or more other subsets in the first number of smaller groups to one or more other network devices;

sampling the first subset of the first number of smaller group at the second sampling rate; and
determining that a percentage of traffic within the first subset of the first number of smaller groups is not over a traffic percentage threshold;
in response to the determination, increasing the second sampling rate to a third sampling rate;
dividing the first subset of the first number of smaller group into a second number of smaller groups, and
selecting a second subset of the second number of smaller groups for monitoring while assigning one or more other subsets in the second number of smaller groups to one or more other network devices;
sampling the second subset of the second number of smaller group at the third sampling rate;
determining that a percentage of traffic within the second subset of the second number of smaller groups is over the traffic percentage threshold; and
reporting that the second subset of the second number of smaller groups for monitoring being abnormal traffic flows in response to the determination that the percentage of traffic within the second subset of the second number of smaller groups is over the traffic percentage threshold.

6. The method of claim 1, wherein the network complies with a standard for software-defined networking (SDN).

7. The method of claim 6, wherein the operations within are performed by the SDN controller of the network.

8. A method implemented in a software-defined networking (SDN) controller to detect traffic anomalies in a SDN network, wherein the SDN network contains network devices, wherein traffic flows transmit through the network devices, the method comprising:
sampling traffic flows within an entry of a first set for monitoring at a first sampling rate, wherein the entry of the first set is monitored by a network device serving as a SDN switch that forwards packets in the traffic flows according to rules in flow tables programmed by the SDN controller;
determining, by the SDN controller, that a traffic anomaly exists in the network device based on the sampling;
in response to the determination that a traffic anomaly exists,
increasing the first sampling rate to a second sampling rate;
dividing the entry of the first set for monitoring into a first number of smaller groups;
selecting a first subset of the first number of smaller groups for monitoring while assigning one or more other subsets in the first number of smaller groups to one or more other network devices;
sampling the first subset of the first number of smaller groups at the second sampling rate; and
determining that a percentage of traffic within the first subset of the first number of smaller groups is not over a traffic percentage threshold;
in response to the determination,
increasing the second sampling rate to a third sampling rate;
dividing the first subset of the first number of smaller group into a second number of smaller groups, and
selecting a second subset of the second number of smaller groups for monitoring while assigning one or more other subsets in the second number of smaller groups to one or more other network devices;
sampling the second subset of the second number of smaller group at the third sampling rate;
determining that a percentage of traffic within the second subset of the second number of smaller groups is over the traffic percentage threshold; and
reporting that the second subset of the second number of smaller groups for monitoring being abnormal traffic flows in response to the determination that the percentage of traffic within the second subset of the second number of smaller groups is over the traffic percentage threshold, wherein the percentage of traffic and the traffic percentage threshold are based on an average and a deviation of traffic within the traffic flows.

9. The method of claim 8, further comprising:
sampling traffic flows at the first sampling rate within the entry of a first set for monitoring in response to the determination that a traffic anomaly does not exist.

10. The method of claim 8, wherein the determination of the traffic anomaly is based on determining that a first deviation of traffic amount within the sampled traffic flows is over a first deviation threshold, wherein the first deviation deviates from a mean of the sampled traffic flows over a period of time.

11. The method of claim 8, in response to the determination that the traffic anomaly exists, prior to performing increasing the sampling rate, further performing:
determining that the entry of the first set for monitoring is a subset of a second entry of the first set for monitoring; and
removing the entry of the first set for monitoring from the first set for monitoring in response to a determination that a second deviation of traffic amount within the entry of the first set for monitoring is below a second deviation threshold, wherein the second deviation deviates from a mean of the second entry of the first set for monitoring.

12. A network device in a network, wherein traffic flows transmit through a number of network devices of the network, the network device comprising:
a flow distribution processor, comprising:
a traffic flow module configured to receive traffic flows of the network;
a monitor set generator configured to
divide the received traffic flows of the network into a plurality of traffic aggregates, wherein each traffic aggregate contains one or more traffic flows, and wherein each traffic aggregate is an entry of a first set for monitoring,
select one or more traffic flows within a traffic aggregate to be one entry of the first set for monitoring, wherein the one or more traffic flows are randomly selected from the traffic aggregate;
a monitor set distributor configured to collect a second set of one or more network devices from the network devices of the network to monitor one or more entries, wherein the network devices of the network serve as software-defined networking (SDN) switches, wherein the second set of one or more network devices processes traffic flows contained within the entry, and wherein the processing includes forwarding packets in the traffic flows according to rules in flow tables programmed by a SDN controller of the network; and the monitor set distributor further configured to select one network device from the second set of one or more network devices to monitor the entry for traffic anomalies, wherein the selecting one network device from the second set of one or more network devices is at least partially based on a monitor count of the network device, wherein the monitor count of the network device is a count of a number of entries of the first set for monitoring that the network device is assigned to monitor; and a database configured to store mapping between entries of the first set for monitoring and the one network device selected to monitor each entry of the first set for monitoring.

13. The network device of claim 12, wherein the first set for monitoring further includes a plurality of groups, wherein each group is a random sample of a traffic aggregate within the plurality of traffic aggregates.

14. The network device of claim 12, wherein the selecting one network device from the second set of one or more network devices is further based on a monitor limitation of the network device.

15. The network device of claim 12, wherein the operations within are performed when there is an update of traffic flows within the network.

16. The network device of claim 12, wherein the operations within are performed upon a request, wherein the request includes at least one of:
   a granularity parameter for the dividing the traffic flows; and
   a selected traffic flows to be divided.

17. A network device in a network, wherein traffic flows transmit through a number of network devices of the network, the network device comprising:
   an anomaly processor, comprising:
      a traffic flow interface configured to receive flows of the network;
      a traffic flow sampler configured to sample the received traffic flows within an entry of a first set for monitoring at a first sampling rate, wherein the entry of the first set is monitored by the network device serving as a software-defined networking (SDN) switch that forwards packets in the traffic flows according to rules in flow tables programmed by a SDN controller;
      an anomaly detector configured to determine that a traffic anomaly exists in the network device;
      a traffic zoom-in module configured to, in response to the determination that a traffic anomaly exists in the network, wherein the network complies with a standard for software-defined networking (SDN),
         increase the first sampling rate to a second sampling rate;
         divide the entry of the first set for monitoring into a first number of smaller groups;
         select a first subset of the first number of smaller groups for monitoring while assigning one or more other subsets in the first number of smaller groups to one or more other network devices; and
         the traffic zoom-in module further configured to determine whether a percentage of traffic within the subset of the first number of smaller groups for monitor is over a traffic percentage threshold, wherein the traffic zoom-in module further increases the second sampling rate to a third sampling rate, divides the first subset of the first number of smaller group into a second number of smaller groups, and selecting a second subset of the second number of smaller groups for monitoring while assigning one or more other subsets in the second number of smaller group to one or more other network devices in response to the percentage of traffic within the subset of the first number of smaller groups for monitor is not over a traffic percentage threshold;
      an anomaly reporter configured to report the second subset of the second number of smaller groups for monitoring being abnormal traffic flows in response to the determination that the percentage of traffic within the subset of the first number of smaller groups for monitor is not over a traffic percentage threshold; and
      a database configured to store the traffic percentage threshold, wherein the percentage of traffic and the traffic percentage threshold are calculated based on a mean and a deviation of traffic within the traffic flows.

18. The network device of claim 17, wherein the determination of a traffic anomaly is based on determining that a first deviation of traffic amount within the sampled traffic flows is over a first deviation threshold, wherein the first deviation deviates from a mean of the sampled traffic flows over a period of time.

19. The network device of claim 17, further comprises a traffic flow combiner configured to:
   determine that the entry of the first set for monitoring is a subset of a second entry of the first set for monitoring; and
   remove the entry of the first set for monitoring from the first set for monitoring in response to a determination that a second deviation of traffic amount within the entry of the first set for monitoring is below a second deviation threshold, wherein the second deviation deviates from a mean of the second entry of the first set for monitoring, in response to the determination that the percentage of traffic within the sampled traffic flows is not over the traffic percentage threshold, prior to performing at least one of increasing the sampling rate and reducing a number of traffic flows within the entry of the first set for monitoring.

20. A method implemented in a software-defined networking (SDN) controller in a SDN network, wherein the SDN network contains network devices, wherein traffic flows transmit through a number of network devices, the method comprising:
   dividing traffic flows of the network into a plurality of traffic aggregates, wherein each traffic aggregate contains one or more traffic flows, and wherein each traffic aggregate is an entry of a first set for monitoring;
   selecting one or more traffic flows within a traffic aggregate to be one entry of the first set for monitoring, wherein the one or more traffic flows are randomly selected from the traffic aggregate;
   for each entry of the first set for monitoring,
      collecting a second set of one or more network devices from the network devices of the network to monitor the entry, wherein the network devices of the network serve as SDN switches, wherein the second set of one or more network devices processes traffic flows contained within the entry, and wherein the processing includes forwarding packets in the traffic flows according to rules in flow tables programmed by the SDN controller; and selecting one network device from the second set of one or more network devices to monitor the entry for a traffic anomaly, wherein the selecting one network device from the second set of one or more network devices is at least partially based on a monitor count of the network device, wherein the monitor count of the network device is a count of a number of entries of the first set for monitoring that the network device is assigned to monitor, wherein the selected network device to monitor an entry of the first set for monitoring performs anomaly detection, and wherein anomaly is detected by:
   sampling traffic flows within an entry of a first set for monitoring at a first sampling rate;
   determining that a traffic anomaly exists in the selected network device;
in response to the determination that a traffic anomaly exists based on the sampling, increasing the first sampling rate to a second sampling rate;
dividing the entry of the first set for monitoring into a first number of smaller groups;
selecting a first subset of the first number of smaller groups for monitoring while assigning one or more other subsets in the first number of smaller groups to one or more other network devices;
sampling the first subset of the first number of smaller group at the second sampling rate; and
determining that a percentage of traffic within the first subset of the first number of smaller groups is not over a traffic percentage threshold;
in response to the determination,
   increasing the second sampling rate to a third sampling rate;
   dividing the first subset of the first number of smaller group into a second number of smaller groups, and
   selecting a second subset of the second number of smaller groups for monitoring while assigning one or more other subsets in the second number of smaller groups to one or more other network devices;
   sampling the second subset of the second number of smaller group at the third sampling rate;
   determining that a percentage of traffic within the second subset of the second number of smaller groups is over the traffic percentage threshold; and
   reporting that the second subset of the second number of smaller groups for monitoring being abnormal traffic flows in response to the determination that the percentage of traffic within the second subset of the second number of smaller groups is over the traffic percentage threshold.

21. A network device in a network, the network device serving as a software-defined networking (SDN) controller, wherein traffic flows transmit through a number of network devices of the network, the network device comprising:
   a traffic flow interface configured to receive flows of the network;
   a traffic flow sampler configured to sample the received traffic flows within an entry of a first set for monitoring at a first sampling rate, wherein the entry of the first set is monitored by one of the number of the network devices serving as SDN switches that forwards packets in the traffic flows according to rules in flow tables programmed by the network device being the SDN controller;
   an anomaly detector configured to determine that a traffic anomaly exists in the one of the number of the network devices;
   a traffic zoom-in module configured to, in response to the determination that a traffic anomaly exists,
     increase the first sampling rate to a second sampling rate;
     divide the entry of the first set for monitoring into a first number of smaller groups;
     select a first subset of the first number of smaller groups for monitoring while assigning one or more other subsets in the first number of smaller groups to one or more other network devices; and
     the traffic zoom-in module further configured to determine whether a percentage of traffic within the subset of the first number of smaller groups for monitor is over a traffic percentage threshold, wherein the traffic zoom-in module further increases the second sampling rate to a third sampling rate, divides the first subset of the first number of smaller group into a second number of smaller groups, and selecting a second subset of the second number of smaller groups for monitoring while assigning one or more other subsets in the second number of smaller groups to one or more other network devices in response to the percentage of traffic within the subset of the first number of smaller groups for monitor is not over a traffic percentage threshold;
   an anomaly reporter configured to report the second subset of the second number of smaller groups for monitoring being abnormal traffic flows in response to the determination that the percentage of traffic within the subset of the first number of smaller groups for monitor is not over a traffic percentage threshold; and
   a database configured to store the traffic percentage threshold, wherein the percentage of traffic and the traffic percentage threshold are based on an average and a deviation of traffic within the traffic flows.

* * * * *